US007516910B1

(12) United States Patent
DeWall et al.

(10) Patent No.: US 7,516,910 B1
(45) Date of Patent: Apr. 14, 2009

(54) PRESSURE WASHER TRIGGER LOCK

(75) Inventors: Christopher C. DeWall, East Troy, WI (US); Richard J. Gilpatrick, Whitewater, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 12/124,031

(22) Filed: May 20, 2008

(51) Int. Cl.
*B05B 9/01* (2006.01)
*B05B 7/02* (2006.01)
*B05B 1/30* (2006.01)
*F16K 35/00* (2006.01)

(52) U.S. Cl. ........................ 239/526; 239/525; 239/569; 251/89; 251/90

(58) Field of Classification Search ................. 239/329, 239/332, 525, 526, 532, 569, 578; 251/89, 251/90, 95, 98–103, 106–109, 111; 222/153.01, 222/153.12, 153.14
See application file for complete search history.

(56) References Cited

U.S. PATENT DOCUMENTS

| | | | |
|---|---|---|---|
| 2,147,287 | A | 2/1939 | Farmer |
| 2,208,850 | A | 7/1940 | Mayer |
| 2,416,719 | A | 3/1947 | Stockdale |
| 2,690,321 | A | 9/1954 | Luna et al. |
| 2,937,813 | A | 5/1960 | Rinkewich |
| 3,888,421 | A | 6/1975 | Chow |
| 3,944,141 | A | 3/1976 | Siczek |
| 4,016,684 | A | 4/1977 | Urda |
| 4,105,164 | A | 8/1978 | Lau et al. |
| 4,195,383 | A | 4/1980 | Leinfelt |
| 4,225,087 | A | 9/1980 | Lawlor |
| 4,245,759 | A | 1/1981 | Baker et al. |
| 4,453,650 | A | 6/1984 | Witte et al. |
| D284,301 | S | 6/1986 | Hengesbach |
| 4,776,517 | A | 10/1988 | Heren |
| 4,802,313 | A | 2/1989 | Smith |
| 4,880,166 | A | 11/1989 | Suttner |
| 4,925,107 | A | 5/1990 | Brown |
| 5,143,299 | A | 9/1992 | Simonetti et al. |
| 5,176,327 | A | 1/1993 | Petersen et al. |
| 5,303,868 | A | 4/1994 | Kroll |
| 5,535,952 | A | 7/1996 | Tada |
| 5,727,736 | A | 3/1998 | Tryon |

(Continued)

OTHER PUBLICATIONS

Skilsaw Sold by Skil Corp.; at least as early as Nov. 2005; 8 pages including 31 photos.

*Primary Examiner*—Darren W Gorman
(74) *Attorney, Agent, or Firm*—Michael Best & Friedrich LLP

(57) ABSTRACT

A pressure washer gun is connectable to a source of fluid. The pressure washer gun includes a housing that defines an interior and a flow path disposed substantially within the interior. The flow path includes an inlet in fluid communication with the source and an outlet. A valve at least partially defines a portion of the flow path and is movable between a closed position and an open position in which fluid travels from the inlet to the outlet. A user interface is movable between an actuated position in which the valve is open and a non-actuated position in which the valve is closed. A lock member is substantially disposed within the interior and is movable in a substantially arcuate path between a locked position in which the lock assembly inhibits movement of the user interface, and an unlocked position.

18 Claims, 6 Drawing Sheets

U.S. PATENT DOCUMENTS

| | | | | | |
|---|---|---|---|---|---|
| 5,740,968 | A | | 4/1998 | Mueller | |
| 5,791,564 | A | * | 8/1998 | Carra | 239/526 |
| D409,720 | S | | 5/1999 | Guo | |
| 6,032,922 | A | | 3/2000 | Shew | |
| 6,079,639 | A | * | 6/2000 | Barbato | 239/525 |
| D431,069 | S | | 9/2000 | Heren | |
| 6,431,468 | B1 | | 8/2002 | Brown et al. | |
| 6,761,324 | B2 | | 7/2004 | Chang | |
| 7,389,949 | B2 | | 6/2008 | Marchand et al. | |
| 2004/0195383 | A1 | | 10/2004 | Amaduzzi | |
| 2007/0051834 | A1 | | 3/2007 | Dexter et al. | |
| 2007/0228190 | A1 | | 10/2007 | Tanner | |

* cited by examiner

PRESSURE WASHER TRIGGER LOCK

BACKGROUND

The present invention relates to a pressure washer system that includes a trigger-actuated gun. More particularly, the present invention relates to a trigger-actuated gun that includes a lock mechanism that reduces unwanted actuations of the trigger.

Pressure washers use high-pressure liquid, typically water, to clean surfaces such as driveways, decks, walls, and the like. Generally, the pressure washer includes a pump that operates to provide the high-pressure fluid through an output hose or passageway. A gun is in fluid communication with the pump and the passageway and includes a trigger mechanism that is actuated by the user to discharge the high-pressure fluid. Generally, the user squeezes the trigger with one hand and supports the discharge end of the gun with the other hand during use.

SUMMARY

The invention provides a pressure washer gun configured to be connected to a source of fluid. The pressure washer gun includes a housing having a first side and a second side that define an interior, and a flow path disposed substantially within the interior and including an inlet in fluid communication with the source and an outlet. A valve at least partially defines a portion of the flow path and is movable between a closed position and an open position in which fluid travels from the inlet to the outlet. A user interface is movable between an actuated position in which the valve is open, and a non-actuated position in which the valve is closed. A lock member is substantially disposed within the interior and is movable in a substantially arcuate path between a locked position in which the lock assembly inhibits movement of the user interface to the actuated position, and an unlocked position. The lock member includes a first actuation portion protruding from a substantially arcuate slot on the first side of the housing, and configured to be engaged by a user to move the lock member along the substantially arcuate path.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 1:
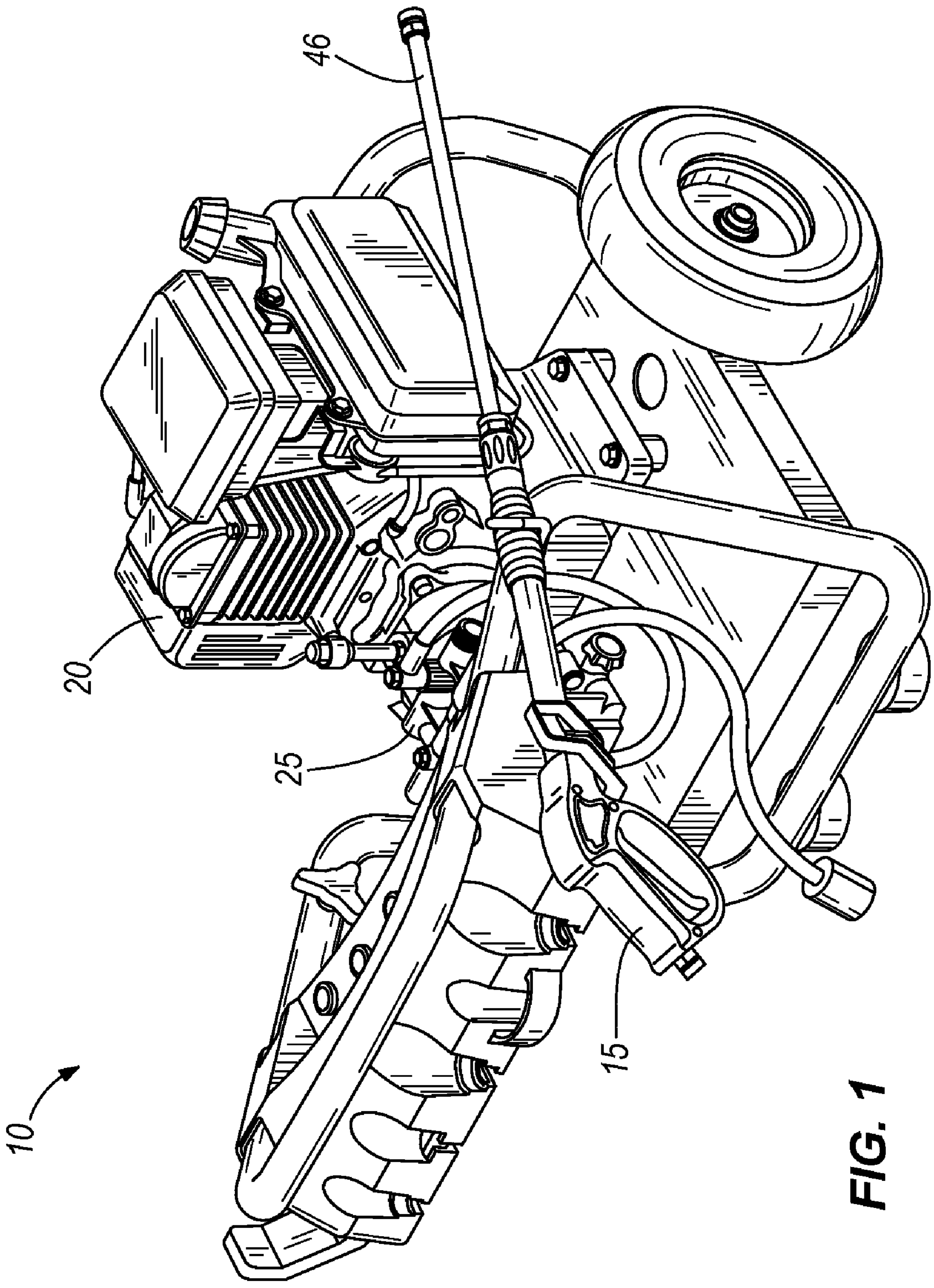
FIG. 1 is a perspective view of a pressure washer including a wand.

FIG. 1 illustrates a pressure washer 10 that includes a trigger-actuated gun 15. The illustrated pressure washer 10 is a mobile pressure washer that is preferably powered by an internal combustion engine 20, although it could be electrically-powered. The engine 20 drives a pump 25 which draws fluid, typically water, from a source (e.g., an onboard reservoir, a residential garden hose, etc.) and delivers the fluid to an output hose or passageway. The passageway is further connected to the gun 15 and any fluid path between the pump 25 and the gun 15 contains a volume of entrained fluid that remains in the fluid path until released.

FIG. 1 illustrates one possible pressure washer 10 that employs the invention. As one of ordinary skill in the art will realize, the invention described herein is suitable for use with virtually any portable pressure washer. As such, the invention should not be limited only to pressure washers 10 similar to the one illustrated in FIG. 1.

Figure 2:
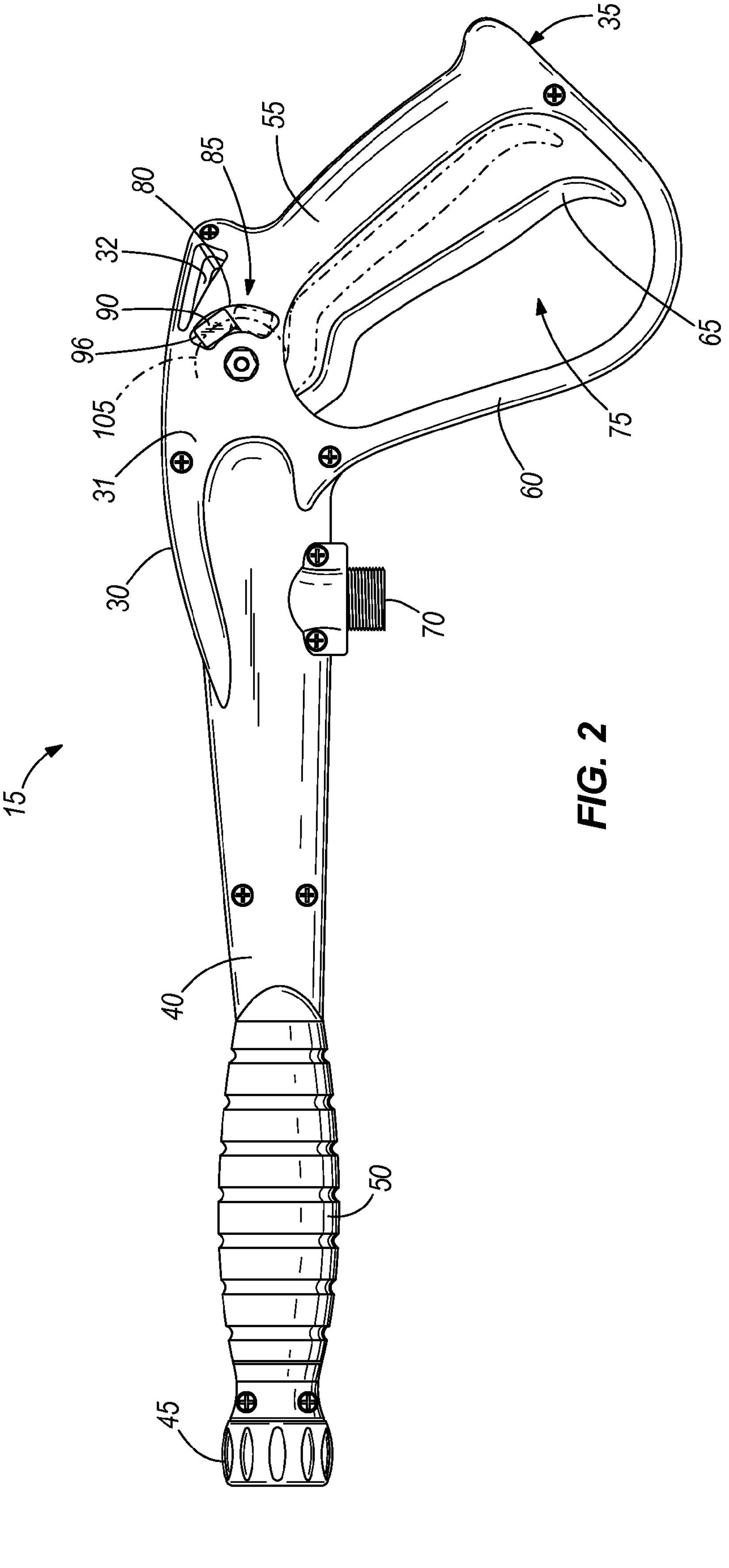
FIG. 2 is a side view of the gun of FIG. 1 in the locked position and showing the unlocked and actuated positions in phantom.
Figure 3:
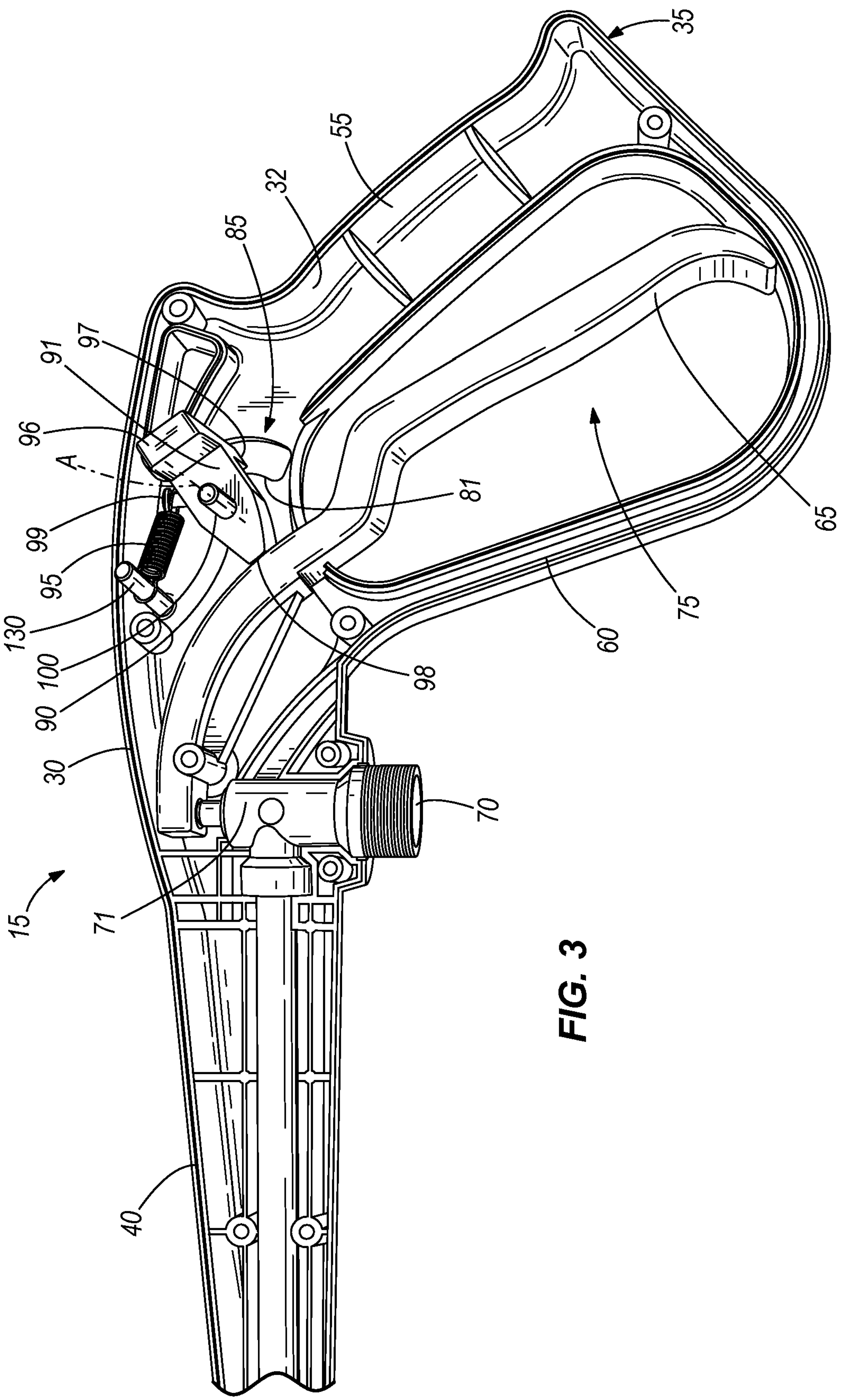
FIG. 3 is a left-side perspective view of a trigger and lock assembly of the gun of FIG. 2 in the locked position with the first side of the housing removed.

As illustrated in FIG. 2, the gun 15 includes a housing 30 having a first side 31 and a second side 32 (shown in FIGS. 3-6) defining an interior, a handle portion 35, a tubular gun portion 40, and a wand attachment portion 45. A first arcuate slot 80 extends through the first side 31 of the housing 30, and a second arcuate slot 81 extends through the second side 32 of the housing 30, shown in FIGS. 3-6. The wand attachment portion 45 receives a nozzle or a wand 46 (shown in FIG. 1). The wand 46 extends the water discharge outlet and may include a quick-connect type fitting to allow the user to quickly and easily switch nozzles or accessories. Several nozzles are available to shape the spray pattern as it is being discharged from the gun 15 or wand 46. For example, one nozzle may produce a fan-shaped spray pattern that spreads at a 60-degree angle, while another nozzle may produce a fan-shaped spray pattern that spreads at a 30-degree angle. The user can choose the nozzle desired, depending on the particular application.

The gun portion 40 extends between the handle portion 35 and the wand attachment portion 45 and may include a handgrip 50. Generally, the gun portion 40 is simply a tube that directs the fluid from the handle portion 35 to the wand attachment portion 45. The handgrip 50, if employed, is typically a thermally insulative material (e.g., rubber, plastic, etc.) that at least somewhat insulates the user's hand from the gun portion 40.

The handle portion 35 includes a body 55, a guard 60, and a trigger or user interface 65. A fluid inlet 70 is disposed between the body 55 and the gun portion 40. The fluid inlet 70 receives the high-pressure fluid from the pump 25 via the passageway. A flow path disposed within the housing 30 guides the fluid from the inlet 70 to a valve 71 (shown in FIGS. 3-4) that is disposed within the housing 30 and is interconnected with the trigger 65. The valve 71 is moved from a closed position to an open position as the user actuates the trigger 65. When in the open position, the valve 71 allows the fluid to flow into the gun portion 40 and out the nozzle.

When the valve 71 is closed, the fluid may be trapped between the valve 71 and the passageway or the pump 25. Valves of this type are well known in the art of pressure washers and need not be described in detail. Also, there are many other valve configurations that may be used, but are not shown.

The guard 60 extends from the body 55 and defines a trigger space 75. The trigger 65 is substantially disposed within this trigger space 75. The guard 60 helps protect the user's hand and the trigger 65 from impacts that may occur during use. In addition, the guard 60 makes it more difficult to inadvertently actuate the trigger 65.

With continued reference to FIG. 2, the trigger 65 extends from the body 55. The trigger 65 is pivotally attached to the body 55 such that it can be moved between actuated and non-actuated positions. Generally, the trigger 65 is biased to the non-actuated position using biasing mechanisms that are well known in the art (e.g., fluid pressure, springs, etc.). As the trigger 65 moves from the non-actuated position to the actuated position, the valve within the body 55 is actuated to initiate the flow of fluid when the pressure washer pump is operating.

To prevent inadvertent actuation of the trigger 65, a trigger lock assembly 85 is disposed substantially within the housing 30 and protruding from the housing 30, as can be seen in FIG. 2. A portion of the trigger lock assembly 85 protrudes from the first arcuate slot 80 on the first side 31 and from the second arcuate slot 81 on the second side 32.

Turning to FIGS. 3-6, the trigger lock assembly 85 is disposed near the trigger 65 and includes a lock member 90, a biasing member 95, and a pin 100. The lock member 90 includes a base member 91, a first actuation portion 96 extending from the base member 91 at a first end of the base member 91, a second actuation portion 97 extending from the opposite side of the base member 91 at the first end of the base member 91, and a trigger engaging portion 98 at a second end of the base member 91. A protrusion 99 extends from the lock member 90 and is coupled to the biasing member 95. The biasing member 95 may include a spring, as illustrated, or another suitable part that biases the lock member 90 to the locked position such as a torsional spring or a leaf spring. The biasing member 95 is coupled to the lock member 90 at a first end and coupled to a fixed portion 130 of the housing 30 at a second end. The fixed portion 130 of the housing 30 may be a pin or a screw therethrough, as shown, or any other protrusion or anchor that provides a connection point that is fixed relative to the housing 30.

Figure 4:
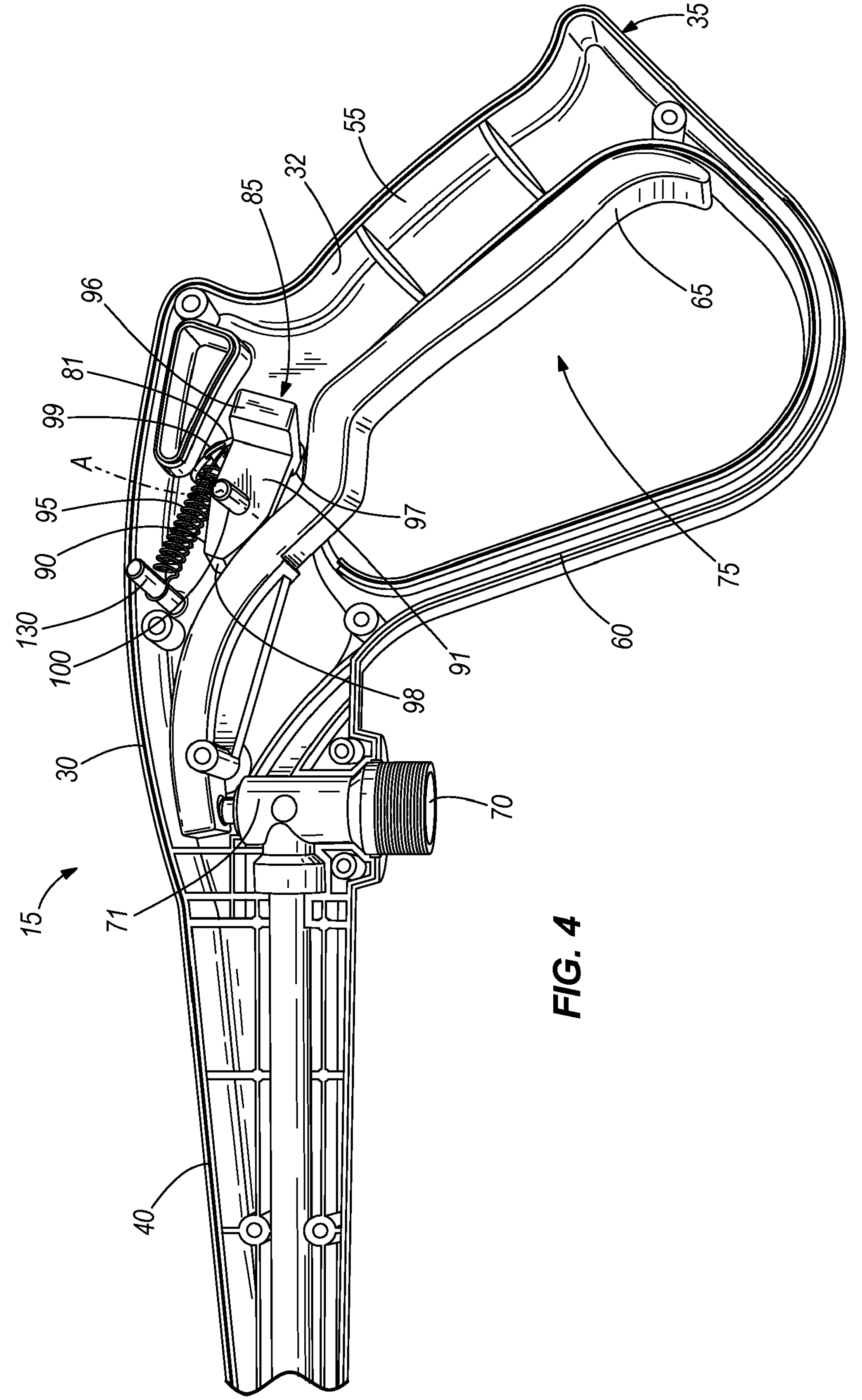
FIG. 4 is a left-side perspective view of the trigger and lock assembly of FIG. 3 in the unlocked and actuated position with the first side of the housing removed.
Figure 5:
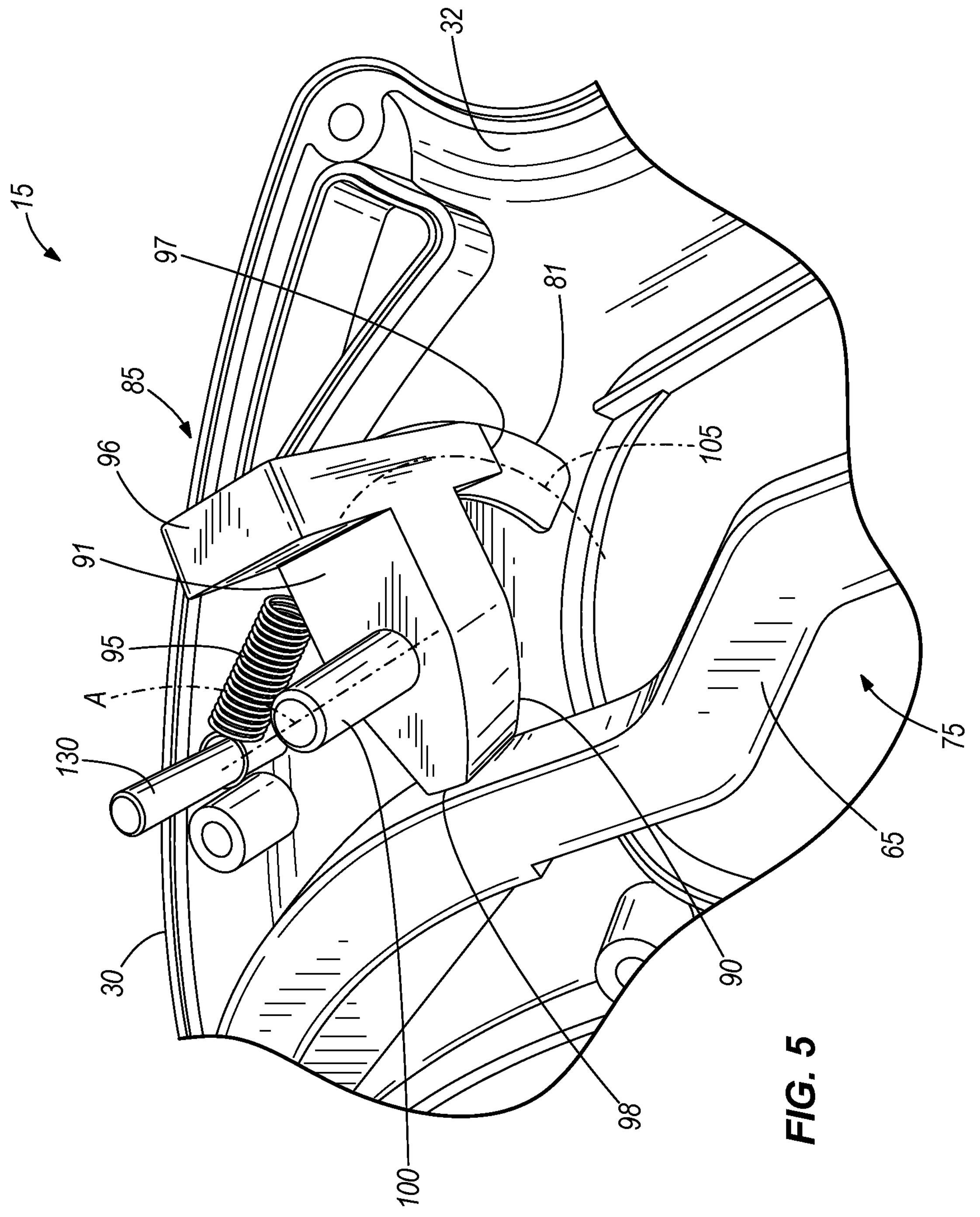
FIG. 5 a close up view of the trigger and lock assembly of FIG. 3.
Figure 6:
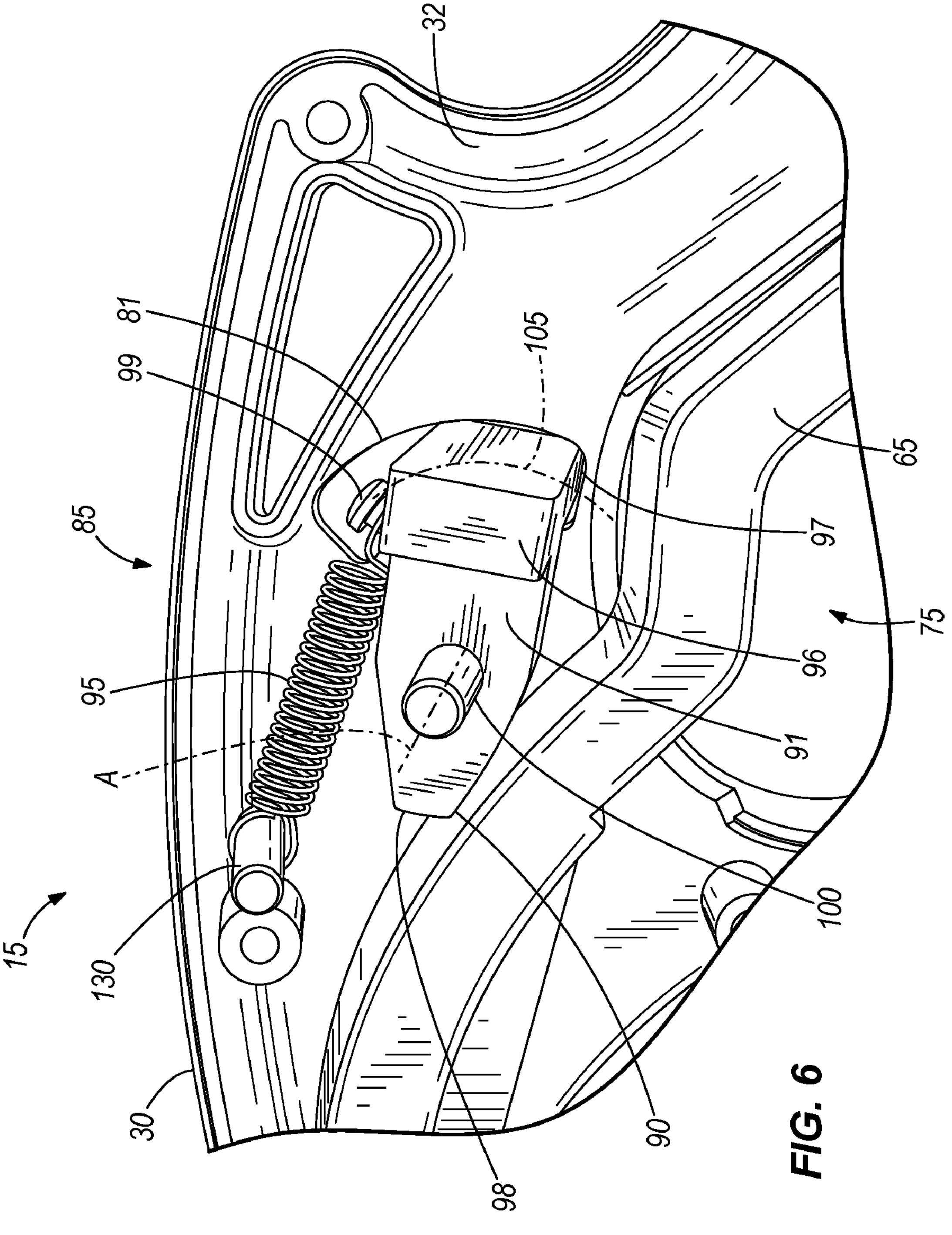
FIG. 6 is a close up view of the trigger and lock assembly of FIG. 4.

The first actuation portion 96 is engageable by a user on the first side 31 of the housing 30 to move the lock member 90 along an arcuate path 105 (shown in FIG. 2) between a locked position (FIGS. 2, 3, and 5) and an unlocked position (FIGS. 4, 6, and phantom in FIG. 2). The arcuate path 105 substantially corresponds to the first arcuate slot 80 and preferably substantially coincides with the curvature of the first arcuate slot 80. Also, the arcuate path 105 substantially corresponds to the second arcuate slot 81 and preferably substantially coincides with the curvature of the second arcuate slot 81. The second actuation portion 97 is engageable by a user on the second side 32 of the housing 30 to move the lock member 90 along the arcuate path 105 (shown in FIG. 2) between the locked position and the unlocked position. The lock member 90 is symmetrical about the base member 91 to allow both left-handed and right-handed users to operate the trigger lock with their respective dominant hand. In the locked position, the lock member 90 inhibits movement of the trigger 65 by direct contact between the trigger engaging portion 98 and the trigger 65 (shown in FIGS. 3 and 5). The lock member 90 includes a locking surface 92 that engages the trigger 65 when a user attempts to actuate the trigger while the lock member 90 is in the locked position. Likewise, the trigger 65 includes a lock-engaging portion that engages the lock member when in the locked position to inhibit movement of the trigger 65 to the actuated position. In the unlocked and actuated position, the trigger 65 inhibits movement of the lock member 90 to the locked position by direct contact between the lock-engaging portion and the lock member 90, as long as the user maintains the trigger 65 in the actuated position (shown in FIGS. 4 and 6). The pin 100 defines a pivot axis A about which the lock member 90 pivots between the locked position and the unlocked position. The axis A defines a center of an arc that substantially corresponds to the arcuate path.

The trigger lock assembly 85 may additionally include a debris guard (not shown) that prevents debris from entering the interior of the housing 30 by way of open portions of the first or second arcuate slots 80, 81. Depending upon the position of the trigger lock assembly 85, portions of the first and second slots 80, 81 open and close. Portions of the slot are closed when the trigger lock assembly 85 is disposed therein, and portions of the slot are open when the trigger lock assembly 85 is not disposed therein. The debris guard would cover open portions of the first or second arcuate slots 80, 81 to prevent debris from entering the interior of the housing 30.

In operation, the user starts the engine 20 to begin operation of the pump 25. The pump 25 draws low-pressure fluid from the source, increases the pressure of the fluid, and delivers the fluid to the passageway. The user grasps the gun 15 and aims it at the surface to be cleaned. The user then pulls the trigger 65 toward the body 55 to open the valve and initiate the flow of high-pressure fluid out of the nozzle. However, the trigger lock assembly 85, which is biased into the locked position, extends forward toward the trigger 65 and engages the trigger 65 at the trigger engaging portion 98 before the trigger 65 can move a sufficient distance to open the valve. Thus, the user is unable to open the valve 71 without first moving the trigger lock assembly 85 to the unlocked position. To move the trigger lock assembly 85, the user must move and maintain the lock member 90 in the unlocked position by applying a force to either the first actuation portion 96 or the second actuation portion 97. Then, the trigger 65 is moved to the actuated position (shown in FIGS. 4 and 6). Once the trigger 65 is in the actuated position, the trigger 65 maintains the trigger lock assembly 85 in the unlocked position. When the user releases the trigger 65, the trigger 65 is returned to the non-actuated position by biasing members as is known in the art. The biasing member 95 then biases the trigger lock assembly 85 back to the locked position.

This configuration allows a user to actuate the trigger 65 with a right or a left hand while simultaneously moving the trigger lock assembly 85 with a thumb of the right or left hand, respectively. Alternatively, the user could move the trigger lock assembly 85 with one hand and the trigger 65 with the thumb of the other hand. The process reduces the likelihood that pressurized fluid will be inadvertently output from the pressure washer 10.

Thus, the invention provides, among other things, a new and useful gun for a pressure washer. Various features and advantages of the invention are set forth in the following claims.

What is claimed is:

1. A pressure washer gun configured to be connected to a source of fluid, the pressure washer gun comprising:

a housing defining an interior, a first side and a second side, and a first substantially arcuate slot in the first side;

a flow path within the interior and including an inlet in fluid communication with the source and an outlet;

a valve having a valve member in the flow path that is movable between a closed position and an open position in which fluid travels from the inlet to the outlet;

a user interface movable between an actuated position in which the valve is open and a non-actuated position in which the valve is closed; and a lock member at least partially disposed within the interior and moveable in a substantially arcuate path between a locked position in which the lock member inhibits movement of the user interface to the actuated position and an unlocked position, wherein the lock member includes a first actuation portion protruding from the first substantially arcuate slot on the first side of the housing, and wherein the first actuation portion is configured to be engaged by a user to move the lock member along the substantially arcuate path between the locked position and the unlocked position.

2. The pressure washer gun of claim 1, wherein the second side of the housing includes a second substantially arcuate slot, wherein the lock member includes a second actuation portion protruding from the second substantially arcuate slot on the second side of the housing and configured to be engaged by a user to move the lock member along the substantially arcuate path between the locked position and the unlocked position.

3. The pressure washer gun of claim 2, wherein the lock member further includes a base member, and wherein the lock member is symmetrical about the base member.

4. The pressure washer gun of claim 1, further comprising a biasing member that biases the lock member toward the locked position.

5. The pressure washer gun of claim 1, wherein the user interface includes a lock engaging portion that engages the lock member when in the locked position to inhibit movement of the user interface toward the actuated position.

6. The pressure washer gun of claim 5, wherein the lock engaging portion is configured to engage the lock member when the user interface is in the actuated position to maintain the lock member in the unlocked position.

7. The pressure washer gun of claim 1, wherein the user interface is biased to the non-actuated position.

8. The pressure washer gun of claim 1, wherein the substantially arcuate path substantially corresponds to the first substantially arcuate slot.

9. The pressure washer gun of claim 8, wherein the substantially arcuate path substantially corresponds to the second substantially arcuate slot.

10. The pressure washer gun of claim 1, wherein the lock member includes a pivot axis therethrough that defines a center of an arc that substantially corresponds to the substantially arcuate path.

11. The pressure washer gun of claim 1, wherein the lock member further includes a base member, and wherein the first actuation portion extends from the base member toward the first side of the housing.

12. The pressure washer gun of claim 11, wherein the base member includes a first end and a second end, and wherein the first actuation portion extends from the first end and a locking surface is located at the second end that engages the user interface when a user attempts to actuate the user interface while the lock member is in the locked position.

13. The pressure washer gun of claim 11, wherein the lock member further includes a second actuation portion, and wherein the second actuation portion extends from the base member toward the second side of the housing.

14. The pressure washer gun of claim 13, wherein the second side of the housing includes a second substantially arcuate slot, and wherein the second actuation portion extends from the base member through the second substantially arcuate slot.

15. The pressure washer gun of claim 13, wherein the second actuation portion extends from the opposite side of the base member from the first actuation portion.

16. The pressure washer gun of claim 13, wherein the base member includes a first end and a second end, and wherein the first actuation portion and the second actuation portion extend from the first end.

17. The pressure washer gun of claim 16, wherein the lock member includes a locking surface at the second end that engages the user interface when a user attempts to actuate the user interface while the lock member is in the locked position.

18. The pressure washer gun of claim 1, wherein the lock member includes a locking surface that engages the user interface when a user attempts to actuate the user interface while the lock member is in the locked position.

* * * * *